United States Patent [19]

Dahl

[11] Patent Number: 4,956,934
[45] Date of Patent: Sep. 18, 1990

[54] FISHING LURE

[76] Inventor: Joshua R. Dahl, Rt. 2, Box 97, Bagley, Minn. 56621

[21] Appl. No.: 380,325

[22] Filed: Jul. 17, 1989

[51] Int. Cl.$^5$ ............................................. A01K 85/00
[52] U.S. Cl. ............................... 43/42.31; 43/42.32; 43/42.33; 43/42.35
[58] Field of Search ............... 43/42.31, 42.32, 42.35, 43/42.33

[56] References Cited

U.S. PATENT DOCUMENTS

| | | | |
|---|---|---|---|
| 2,288,595 | 7/1942 | Peterson | 43/42.33 |
| 2,309,521 | 1/1943 | Mabee | 43/42.33 |
| 2,598,360 | 5/1952 | Cummins | 43/42.31 |
| 2,613,471 | 10/1952 | Traycik | 43/42.31 |
| 2,741,864 | 4/1956 | Shotton | 43/42.31 |
| 2,938,294 | 5/1960 | Bachmann | 43/42.33 |
| 3,505,754 | 4/1970 | Lawlor | 43/42.33 |
| 3,879,883 | 4/1975 | Strader | 43/42.32 |
| 4,437,256 | 3/1984 | Kulak | 43/42.33 |
| 4,638,584 | 1/1987 | Lindsay | 43/42.31 |
| 4,823,497 | 4/1989 | Pierce | 43/42.31 |

*Primary Examiner*—Kurt Rowan
*Attorney, Agent, or Firm*—James V. Harmon

[57] ABSTRACT

An artificial fishing lure is described having a hollow transparent body formed from transparent plastic. Within the body is a sealed compartment containing an antifreezing liquid in which is suspended a multiplicity of small reflective flakes that shimmer when the lure is pulled through the water to attract fish.

7 Claims, 2 Drawing Sheets

FISHING LURE

FIELD OF THE INVENTION

The present invention relates generally to fishing equipment, and more particularly to liquid-containing light-reflective artificial fishing lures.

BACKGROUND OF THE INVENTION

In the past, attempts have been made to improve the ability of an artificial fishing lure to attract fish by enhancing its light-reflective properties. For example, U.S. Pat. No. 2,288,595 describes an artificial fishing lure which has a chamber loosely filled with small discs made of metal or plastic. During use, water enters the lure and moves the discs somewhat to simulate the shimmering appearance of the scales of a bait fish as it darts about when the lure is pulled through the water. Because the lure described therein relies on inflow of outside water to impart movement to the discs, it is subject over time to the accumulation of deposits, films, molds and/or algae from lake or sea water on the inside surface of the chamber. This can coat or dull the inside walls of the chamber, the discs, or both, thus reducing or eliminating the light-reflective properties that attract fish. Furthermore, the artificial fishing lure described therein is subject to rupture or freezing if used for ice fishing, thus reducing its usefulness during the winter months. The present invention provides an improved artificial fishing lure which overcomes these deficiencies.

SUMMARY OF THE INVENTION

The present invention resides in an artificial fishing lure that includes a hollow body formed by walls of transparent or lightly colored plastic, permitting penetration of light. In a preferred embodiment, the body walls are thin and shaped like a fish. The hollow body is sealed to define a leakproof interior chamber. The chamber is filled with a transparent liquid in which bright colored or reflective flakes are suspended. The liquid is preferably resistant to freezing, i.e. an antifreeze solution and the specific gravity of the flakes is preferably fairly close to that of the liquid to help ensure that the flakes will remain in suspension. A diving plane or fin can be attached to the body in a fixed position to impart motion to the lure or to stabilize it during use. The diving plane can be attached to the body wall in a fixed position projecting forwardly from the body to cause the lure to dive and wobble. A connector is secured to the lure in a fixed position to permit attachment of a fishing line to pull the lure through the water.

THE DRAWINGS

DETAILED DESCRIPTION OF THE INVENTION

The present invention is embodied in several types of light-reflective artificial fishing lures.

In accordance with the present invention, a fishing lure is provided with a hollow chamber in which a liquid is permanently sealed. The chamber is formed from a transparent plastic. The term "transparent" as used herein is intended to refer to either clear or colored plastic which allows the interior of the lure to be seen. Within the hollow interior is permanently sealed a transparent liquid in which reflective flakes are suspended. This liquid is resistant to freezing. This can be accomplished by providing an antifreezing solution such as a hydric alcohol mixed with water. Within the antifreezing solution are suspended a multiplicity of reflective flakes of various sizes.

The reflective flakes are preferably made relatively light in weight and with a controlled specific gravity to help maintain them in suspension. This can be accomplished by matching the specific gravity of the flake so that it is sufficiently close to the specific gravity of the antifreezing liquid in which the flakes are contained so as to promote continuous suspension. This makes the flakes more visible, especially at night or in very deep or dark water so as to attract fish from a greater distance. The flakes are preferably on the order of about 1/32nd of an inch to about about 3/16ths of an inch from edge to edge and are very thin.

One outstanding material from which the flakes can be formed is a metallized plastic such as a thin plastic film, e.g. polyester film, which is metallized for example with aluminum, copper, nickel or zinc by means of vacuum electrodeposition. The metal is in this way deposited on one surface of a film by vapor deposition under vacuum. The metal can also be covered with a colored varnish to impart a color. Flakes made in this way are relatively light so that the specific gravity is fairly similar to that of the liquid.

In one preferred product made in accordance with the invention the flakes remain in suspension for several seconds after agitation. It is sufficient, however, that the flakes remain in suspension for only a few seconds since the lure is normally subjected to continuous agitation. If the specific gravities are matched quite closely, flakes can however be made to stay in suspension for more than just a few seconds and as long as a few minutes. Generally, the more similar the specific gravities, the longer the flakes will remain visible and will continue to attract fish through a sparkling effect in which the flakes appear to shimmer as the lure moves through the water. This has been found highly effective in insuring the attraction of fish. It was also discovered that an air bubble present in the liquid will help to promote agitation of the liquid and the suspended flakes.

Figure 1:
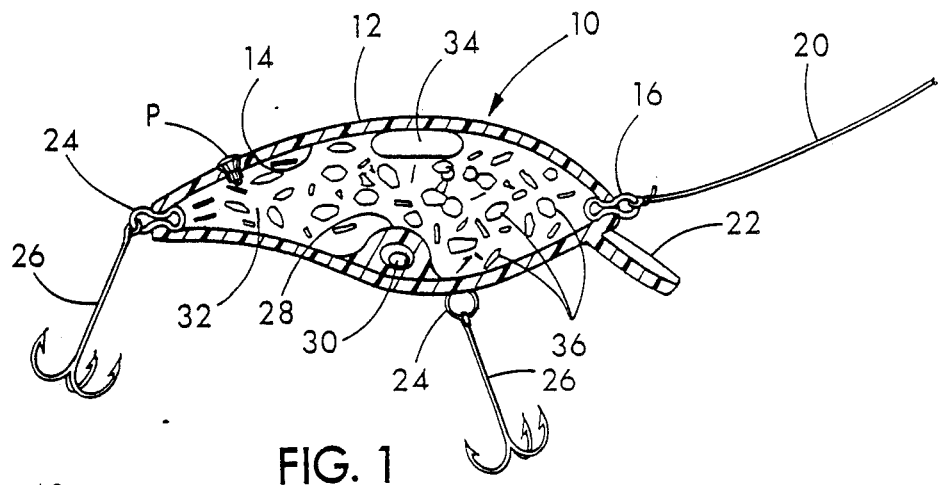
FIG. 1 is a vertical cross-sectional view of one type of artificial fishing lure according to the invention.

In FIG. 1, the type of lure known as a castingtrolling lure is indicated generally by reference numeral 10 and has a body wall 12 formed from transparent plastic with a hollow interior chamber 14. A seal P permanently seals a small hole in the body wall 12 which can be formed from a transparent or lightly colored plastic, e.g. Lucite ®, Delrin ® or Nylon ®. In the chamber 14 is a liquid 32 in which a multiplicity of small reflective flakes 36 are suspended. The liquid can be composed of water (50%) and ethylene glycol (50%). The specific gravity of the flakes 36 can be controlled by adjusting the relative amounts of plastic and metal and by employing a resin of a selected specific gravity, e.g. polyester or polyethylene. An air bubble 34 is provided in the liquid to encourage movement of the small reflective flakes. Inside the chamber 14 is a compartment 28 which contains at least one loose weight 30 in the form of a lead ball that causes a rattling sound to be made simultaneously with the movement of the small reflective flakes in the liquid-filled chamber to attract fish by simultaneous audible and shimmering visual stimuli. A connector 16 is secured to the lure in a fixed position to permit attachment of a fishing line 20 to pull the lure through the water during use. Attachment members 24 are also secured to the lure in a fixed position to permit attachment of hooks 26. A diving plane 22 is attached to the front of the body wall 12 in a fixed position and projects forwardly from the body, causing the lure to dive during usage and to agitate the flakes 36 and keep them in suspension.

Figure 2:
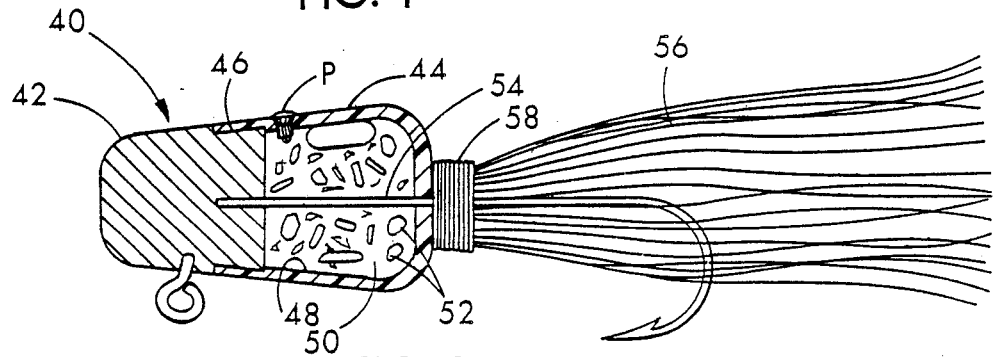
FIG. 2 is a vertical cross-sectional view of another form of the invention.

In FIG. 2, the type of lure known as a jig is indicated generally at 40. The lure includes a heavy weight portion 42 at the front and a hollow transparent body 44 with an interior chamber 48. A seal P permanently seals a small hole in the wall of body 44. The body portion 44 can be formed from a transparent or lightly colored plastic wall that defines the chamber 48. Chamber 48 contains a transparent antifreezing liquid 50 in which small reflective flakes 52 are suspended. It also contains an air bubble which was found to be highly effective in encouraging movement of the reflective flakes 52. The wall of transparent or lightly colored plastic body 44 is attached to the weight portion 42 by being sealed within a circular recess 46 in the weight 42. A hook 54 is permanently attached to the lure in a fixed position running from the weight through the center of the chamber 48. A multiplicity of fibers 56 are attached to the lure by means of a string 58.

Figure 3:
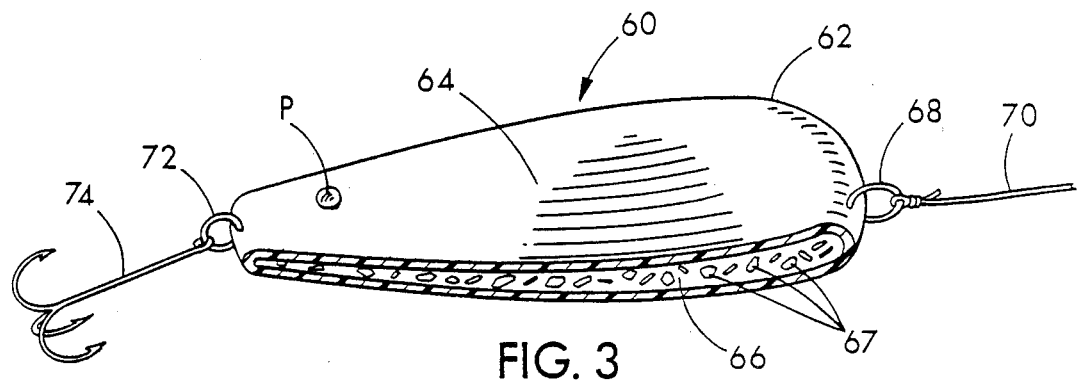
FIG. 3 is a vertical cross-sectional view of another form of the invention.

In FIG. 3, the type of lure known as a spoon is indicated generally by reference numeral 60. Again, the body is hollow. A seal P permanently seals a small hole in a body wall 62 composed of transparent or lightly colored plastic. The body is dished or cupped at 64. The interior chamber 66 contains liquid 66 in which small reflective flakes 67 are suspended. A connector 68 is secured to the lure in a fixed position to permit attachment of a fishing line 70 with which to pull the lure through the water during use. An attachment member 72 is secured to the lure in a fixed position to permit attachment of a hook 74.

Figure 4:
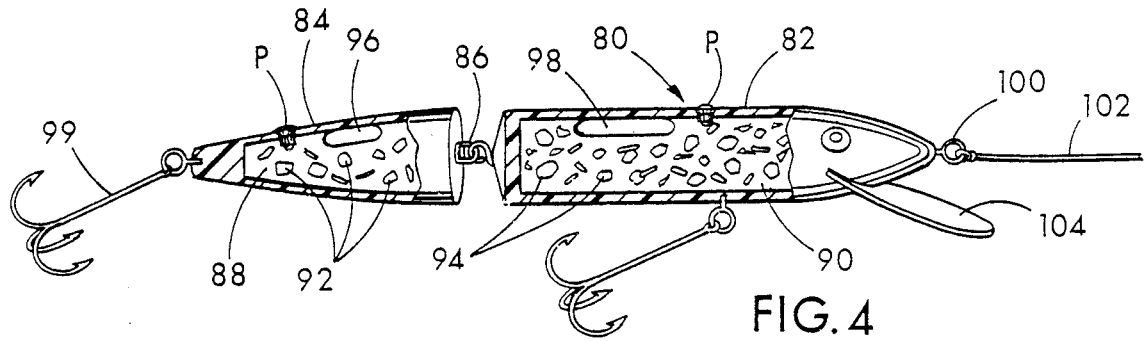
FIG. 4 is a vertical cross-sectional view of yet another form of the invention.

In FIG. 4, the type of lure known as a jointed plug is indicated generally by reference numeral 80. The plug includes two portions comprising hollow bodies 82 and 84 joined by means of a connector 86. Seals P permanently seal small holes in transparent body walls 82 and 84, respectively. The body walls are composed of transparent or lightly colored plastic. Each chamber contains liquid 88 and 90, respectively, in which small reflective flakes 92 and 94, respectively, are suspended. Each also contains an air bubble 96 and 98, respectively. This helps to ensure movement of the small reflective flakes. A connector 100 is secured to the lure in a fixed position to permit attachment of a fishing line 102 for pulling the lure through the water during use. Attachment members are secured to the lure in a fixed position to permit attachment of hooks 99. A diving plane 104 is attached to the body wall 82 in a fixed position projecting forwardly from the body to cause the lure to dive and to shake the liquid 80, 90 and move air bubbles 96, 98, thereby agitating the suspended flakes 92, 94.

Figure 5:
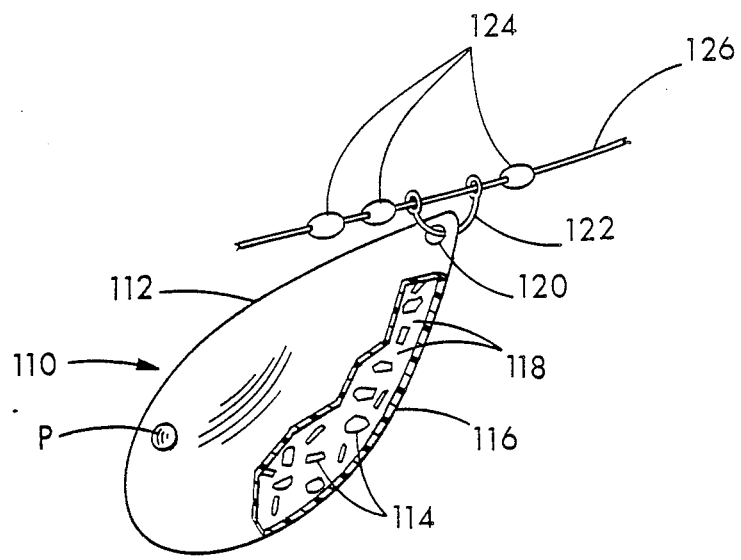
FIG. 5 is a vertical cross-sectional view of another form of the invention.

In FIG. 5, the type of lure known as a spinner blade is indicated generally by reference numeral 110. Seal P permanently seals a small hole in the body wall 116 of transparent or lightly colored plastic that defines a chamber 112 containing liquid 118 in which small reflective flakes 114 are suspended. The spinner 110 is slightly concave. There is an opening 120 through which an attachment 122 is inserted between beads 124 on a fishing line 126.

Figure 6:
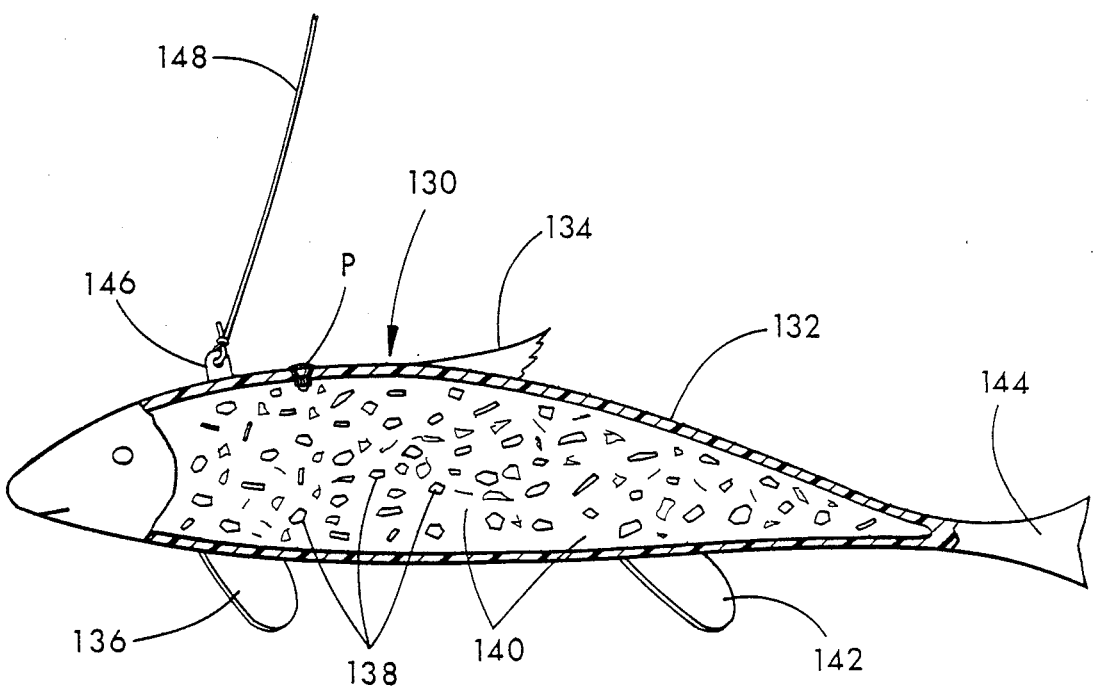
FIG. 6 is a vertical cross-sectional view of still another form of the invention.

In FIG. 6, the type of lure known as a decoy for ice fishing is indicated generally by reference numeral 130. The lure is hollow. A seal P permanently seals a small hole in the body wall 132 composed of transparent or lightly colored plastic that defines a chamber containing liquid 140 in which small reflective flakes 138 are suspended. Flat stabilizing fins 134, 136 and 142, respectively, are attached to the body wall 132 in a fixed position, as is a tail 144, to stabilize the body during usage. A connector 146 is secured to the lure in a fixed a position to permit attachment of a fishing line 148 to pull the lure through the water.

It will be appreciated that although specific embodiments of the invention have been described herein for purposes of illustration, various modifications may be made within the scope of the appended claims without departing from the spirit and scope of the invention. Accordingly, the invention is not limited except as by the appended claims.

What is claimed is:

1. An artificial fishing lure composed of, a substantially hollow body having walls of transparent or lightly colored transparent plastic containing at least one chamber, a transparent antifreeze liquid contained in at least one of the chambers, a multiplicity of small reflective flakes contained within the liquid-filled chamber and suspended in the liquid, said flakes having a specific gravity sufficiently close to that of the liquid in which the flakes are contained so as to promote suspension thereof in the liquid to make the lure more visible, especially at night or in very deep or dark water, so as to attract fish from a greater distance, the liquid comprises a transparent antifreezing solution having a freezing point sufficiently low to resist freezing when used for ice fishing, said flakes comprise pieces of plastic film that have been metallized to render the pieces light reflective by electrodeposition of a metal onto a least one surface thereof to control the relative amounts of plastic and metal, the specific gravity of the liquid and the flakes are matched such that the specific gravity of each is sufficiently close to promote suspension of the flakes in the liquid whereby the flakes remain in suspension for at least a few seconds after the lure is agitated, means sealing each such chamber to prevent escape and/or evaporation of the antifreezing liquid such that the retention of the liquid therein prevents deposits, films, molds and/or algae from coating the inside walls of the chamber and dulling the flakes which if it occurred could reduce or destroy the effectiveness of the lure in attracting fish, and at least one connector to which a fishing line can be attached.

2. The lure of claim 1 wherein the flakes are colored.

3. The lure of claim 1 wherein the liquid is a transparent mixture of water and a water miscible polar liquid.

4. The lure of claim 1 wherein the liquid is colored and the density thereof is set at a predetermined value.

5. The lure of claim 1 wherein the liquid is an antifreezing solution composed of a water miscible hydric alcohol and water to prevent freezing and/or rupturing of the lure and to suspend said flakes.

6. The lure of claim 1 wherein there is at least one weight contained within a separate compartment within the chamber to produce a rattling sound as movement is imparted to the lure and to the flakes contained in the liquid-filled chamber to attract fish by providing simultaneous visual and audible stimuli.

7. The lure of claim 1 wherein an air bubble is present within the liquid to promote movement of the flakes and thereby simulate the shimmering appearance of the scales of a bait fish as the lure darts about when it is pulled through the water.

* * * * *